US009849649B2

(12) United States Patent
Immordino et al.

(10) Patent No.: US 9,849,649 B2
(45) Date of Patent: Dec. 26, 2017

(54) MAGNET RECEPTIVE PANELS AND METHODS

(71) Applicant: United States Gypsum Company, Chicago, IL (US)

(72) Inventors: Salvatore Immordino, Trevor, WI (US); Vittorio A. Immordino, Trevor, WI (US); David D. Pelot, Chicago, IL (US); Kevin W. Moyer, Jr., Chicago, IL (US); Terry L. Rosenstiel, Vernon Hills, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 48 days.

(21) Appl. No.: 14/974,444

(22) Filed: Dec. 18, 2015

(65) Prior Publication Data

US 2016/0236444 A1 Aug. 18, 2016

Related U.S. Application Data

(60) Provisional application No. 62/117,204, filed on Feb. 17, 2015.

(51) Int. Cl.
| | |
|---|---|
| B32B 13/06 | (2006.01) |
| B32B 37/12 | (2006.01) |
| B32B 7/12 | (2006.01) |
| B32B 13/08 | (2006.01) |
| B32B 3/00 | (2006.01) |

(Continued)

(52) U.S. Cl.
CPC ............... *B32B 13/06* (2013.01); *B32B 3/00* (2013.01); *B32B 7/02* (2013.01); *B32B 7/12* (2013.01); *B32B 13/08* (2013.01); *B32B 29/00* (2013.01); *B32B 37/12* (2013.01); *E04C 2/043* (2013.01); *E04F 13/0883* (2013.01); *E04F 13/14* (2013.01); *B32B 27/00* (2013.01); *B32B 2307/208* (2013.01); *B32B 2419/04* (2013.01); *B32B 2607/00* (2013.01);

(Continued)

(58) Field of Classification Search
None
See application file for complete search history.

(56) References Cited

U.S. PATENT DOCUMENTS 3,031,799 A * 5/1962 Bradsby .................... A47F 5/08
248/467
4,884,375 A 12/1989 Wendt
(Continued)

FOREIGN PATENT DOCUMENTS

| CA | WO 2015161370 A1 * 10/2015 | ............. H01F 7/021 |
|---|---|---|
| DE | 29 03 213 A1 7/1980 | |

(Continued)

OTHER PUBLICATIONS

"iPort LanchPort WallStation"; Amazon (Feb. 12, 2012); <https://www.amazon.com/iPort-WallStation-LanchPort-White/dp/B007P6R0OQ/ref=sr_1_2/144-0619328-0273922?ie=UTF8&qid=1501590119&sr=8-2&keywords=iport+launchport>.*

(Continued)

*Primary Examiner* — David Sample
*Assistant Examiner* — Donald M Flores, Jr.
(74) *Attorney, Agent, or Firm* — Greer, Burns & Crain, Ltd.; Pradip Sahu; Philip T. Petti (57) ABSTRACT

Provided are building panels comprising at least one magnet receptive element, methods for making such panels, and kits and methods for attaching objects to a panel without nails or screws.

15 Claims, 10 Drawing Sheets

(51) Int. Cl.
*B32B 7/02* (2006.01)
*B32B 29/00* (2006.01)
*E04F 13/08* (2006.01)
*E04C 2/04* (2006.01)
*E04F 13/14* (2006.01)
*B32B 27/00* (2006.01)
*E04F 13/00* (2006.01)

(52) U.S. Cl.
CPC ............... *E04F 13/00* (2013.01); *Y10S 52/04* (2013.01); *Y10T 428/239* (2015.01); *Y10T 428/24008* (2015.01)

(56) References Cited

U.S. PATENT DOCUMENTS

| | | | | |
|---|---|---|---|---|
| 5,414,969 | A * | 5/1995 | Krejci | ................ E04B 9/064 156/71 |
| 5,643,510 | A | 7/1997 | Sucech | |
| 7,187,261 | B2 * | 3/2007 | Cassar | ................ B23Q 3/1546 335/303 |
| 8,197,952 | B2 | 6/2012 | Yu et al. | |
| 8,400,017 | B2 * | 3/2013 | Kurs | ................ B60L 3/0069 307/104 |
| 8,999,478 | B1 * | 4/2015 | Medlen | ................ E06B 3/7001 428/99 |
| 9,567,794 | B2 * | 2/2017 | Medlen | ................ E06B 3/7001 |
| 2003/0150190 | A1 * | 8/2003 | Schroth | ................ E04C 2/043 52/794.1 |
| 2009/0320407 | A1 * | 12/2009 | Johansson | ................ E04B 2/7457 52/746.1 |
| 2013/0002191 | A1 * | 1/2013 | Jung | ................ H02J 7/025 320/103 |

FOREIGN PATENT DOCUMENTS

| | | |
|---|---|---|
| EP | 1 614 827 A1 | 1/2006 |
| GB | 2 102 405 A | 2/1983 |
| WO | WO 2009010160 A2 | 1/2009 |

OTHER PUBLICATIONS

Fingas, "LG's super-thin OLED screen sticks to your wall using magnets", http://www.engadget.com/2015/05/19/lg-oled-magnetic-mount/, May 20, 2015.

* cited by examiner

MAGNET RECEPTIVE PANELS AND METHODS

CROSS-REFERENCE TO RELATED APPLICATIONS

This application claims the benefit of priority from U.S. provisional patent application 62/117,204 filed Feb. 17, 2015, the entire disclosure of which is incorporated herein by reference.

FIELD OF THE INVENTION

The invention relates to building panels that are magnet receptive, and methods of making and using the magnet receptive panels. The invention also relates to magnet panels and methods of making and using the magnet panels.

BACKGROUND

Many building panels which are produced from gypsum (calcium sulfate dihydrate, landplaster) are commonly utilized in building construction. These panels can be used to construct walls, ceilings, doors, partitions and in many other applications. Other panels commonly used in construction include cement panels and panels made from gypsum and wood fiber.

As described in patents assigned to United States Gypsum Company (Chicago, Ill.), including U.S. Pat. Nos. 8,197,952 and 5,643,510, various methods are known for obtaining gypsum panels. Such methods include those in which gypsum is calcined first. The calcined gypsum is then mixed with water to form a gypsum slurry. Other components can be added to the slurry, including for example, binders, fibers, fillers, surfactants, defoamers, plasticizers, set accelerators and set retarders. The gypsum slurry can be sandwiched between two cover sheets and formed into panels which are then allowed to set. In some applications, at least one cover sheet is paper. Such gypsum panels are referred to as wallboard.

Alternatively, a gypsum slurry can be formulated with fibers and other components and is shaped into a gypsum panel which is allowed to set without the use of cover sheets. Such gypsum panels are known as fiberboards.

Gypsum panels provide many advantages in construction—they are light-weight, yet fire-resistant and easy to install. Gypsum panels can be also formed into various custom shapes and they can be cut to a particular custom size.

Because gypsum panels are used as interior walls and ceilings, there is often a need to attach various objects to the panels such as for example, pictures, paintings, light fixtures, mirrors, speakers, various sensors, smoke alarms, and monitors. Conventionally, attaching an object to a wall or ceiling requires nails, screws or adhesives. Some of such methods and systems are provided in U.S. Pat. No. 4,884,375 assigned to USG Interiors, Inc. After the object is no longer needed and is removed from the gypsum panel or is moved to a new position, the gypsum panel's surface remains damaged with an imperfection left in the place where a nail or screw used to be. Restoring the damaged gypsum panel may require patching a hole, sanding it and then painting over the patch to blend the repaired area with the rest of the gypsum panel. However and even after all these steps, the damaged gypsum panel may still continue to look uneven and discolored, especially if the wall surface was previously decorated. Thus, there is a need for improved ways for attaching various objects to a wall or ceiling without the use of nails or screws or adhesives.

SUMMARY

This invention provides a building panel which enables users to support objects such as pictures, televisions, shelving, lighting, equipment, tools, signs, etc. on the panel without the use of wall-damaging nails or screws.

One embodiment provides a building panel comprising at least one magnet receptive element. In some embodiments, the panel comprises a gypsum core covered on at least one side with a paper sheet and the magnet receptive element positioned in at least one of the following locations: embedded in the gypsum core, embedded in the paper sheet, adjacent to at least one surface of the gypsum core, adjacent to at least one surface of the paper sheet, or a combination thereof.

Further embodiments provide panels in which magnet receptive elements are arranged into a pattern. Various patterns of magnet receptive elements are contemplated, including a disjointed pattern, discontinuous pattern, continuous pattern, grid, array, geometrically spaced, randomly spaced, spaced in at least one direction, and any combination thereof. At least some patterns include those in which at least two magnet receptive elements are located so that the angle and distance between the elements can be of any value. A magnet receptive element may comprise a ferromagnetic material selected from the group consisting of iron, nickel, cobalt, alloys with rare earth metals and any combination thereof.

Magnet receptive elements may be provided as a magnet receptive tape, magnet receptive sheet, magnet receptive paint, magnet receptive coating, foil, shim, magnetic tape, magnetic sheet, magnetic paint, magnetic coating, and any combination thereof. In some embodiments, magnet receptive elements have magnetic properties and can function as a magnet.

Various magnet receptive elements are suitable, including those comprising a ferromagnetic material selected from iron, nickel, cobalt, alloys with rare earth metals and any combination thereof. A magnet receptive element can comprise a tape comprising a ferromagnetic material and/or a paint prepared with a magnet receptive material. Some embodiments include a magnet receptive element which is capable of producing a magnetic field.

Various building panels include a gypsum fiberboard, gypsum wallboard, cement panel, ceiling tile and plastic panel. In some embodiments, a cover sheet can be applied over the magnet receptive elements and suitable cover sheets include paper, plastic, coating and any combination thereof.

Further embodiments provide a method for making a gypsum panel, comprising positioning at least one magnet receptive element on the gypsum panel. In some embodiments, magnet receptive elements are positioned on the gypsum panel by at least one of the following methods:

painting the magnet receptive elements on at least one surface of the gypsum panel;
printing the magnet receptive elements on at least one surface of the gypsum panel;
attaching the magnet receptive elements with an adhesive to at least one surface of the gypsum panel;
attaching magnet receptive elements by using a mechanical attaching design or device to at least one surface of the gypsum panel;
depositing the magnet receptive elements on the surface of the gypsum panel which has not been fully set; and
any combination thereof.

Further embodiments provide a kit for making a building panel, the kit comprising an item selected from the group consisting of: a magnet receptive tape, a magnet receptive sheet, a magnet receptive paint; an adhesive, a resonator, a magnet induction (MI) signal repeater, and any combination thereof. The kit may further comprise a magnet selected from the group consisting of alnico magnets, magnets made from ferromagnetic materials, rare-earth magnets, ceramic magnets, neodymium magnets and any combination thereof.

BRIEF DESCRIPTION OF THE DRAWINGS

FIGS. 1A and 1B are a front view of a building panel with a grid of disjointed magnet receptive elements. In FIG. 1A, the elements in two adjacent horizontal rows are shifted. In FIG. 1B, the elements in two adjacent horizontal rows are aligned;

FIGS. 7A-7F are embodiments of a magnet receptive panel with a grid of magnet receptive elements. FIGS. 8A-8B are graphs reporting conductivity measurements for magnet receptive panels of FIGS. 7A-7F. FIG. 8A is a graph for panels of FIGS. 7A-7D. FIG. 8B is a graph for panels of FIGS. 7E-7F.

DETAILED DESCRIPTION

The present invention provides a building panel which comprises a magnet receptive element. Various objects such, as for example without limitation, pictures, paintings, light fixtures, mirrors, speakers, various sensors, smoke alarms, and LCD screens can be attached to the building panel via a magnet and without nails, screws or adhesives. Thus, various objects can be easily attached to the building panel, removed from the building panel, and optionally reattached to another area of the building panel without damage to the building panel.

One embodiment provides a magnet receptive substance connected to a wall, including floors, ceilings, face and/or backing side of a wall partition, or embedded in a wall so that an object can be supported at any location on a wall using at least one magnet. The magnet can be directly or indirectly connected to the object. In some embodiments, the magnet is connected to the object with a string or wire.

Various objects can be secured on the building panel comprising a magnet receptive element without the need for nails or screws. Such objects include objects which can be operated with typical wire and plug electricity or wireless electricity, including for example, a lamp, radio, screen and fan.

One embodiment provides a building panel with a pattern of magnet receptive elements located on at least one surface of the building panel and/or embedded into the building panel. Various patterns for the magnet receptive elements are contemplated, including, but not limited to, discontinuous, continuous, disjointed, grid, array, geometrically spaced, randomly spaced, or spaced in one, two, or more directions.

Figure 1A:
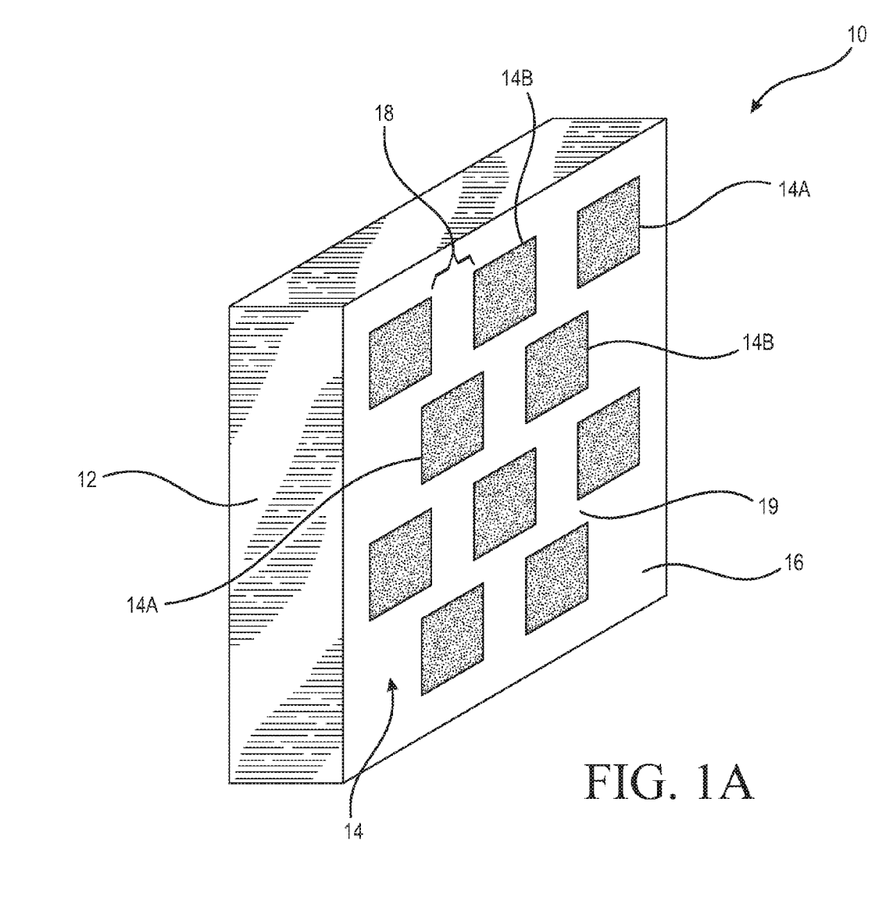
Figure 1B:
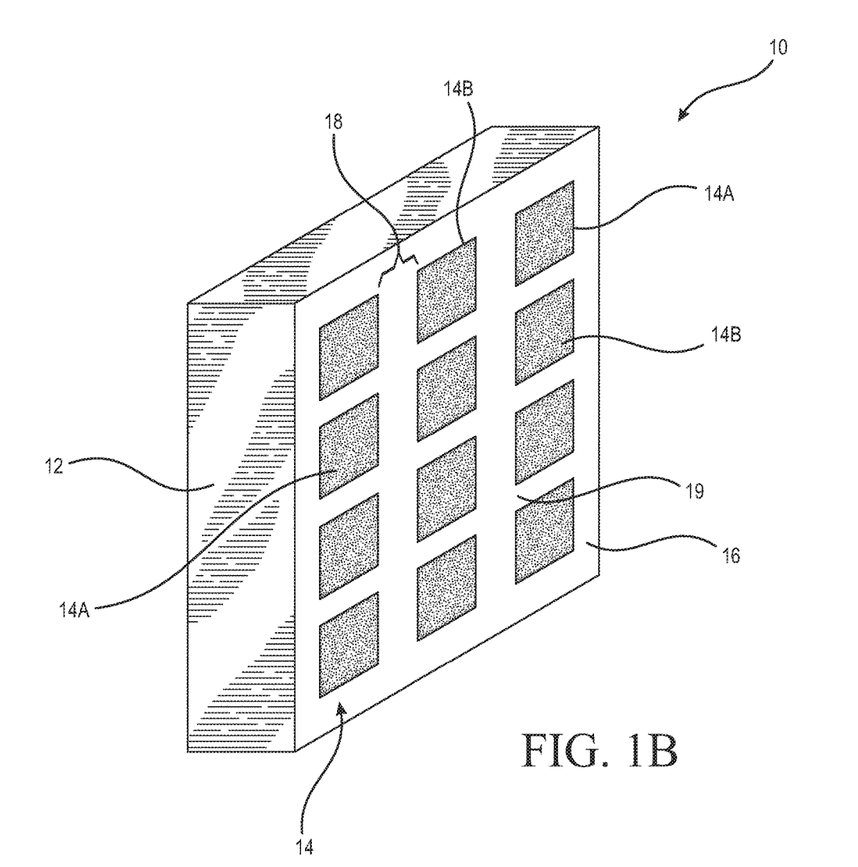

One embodiment of a magnet receptive panel (10) is shown in FIG. 1A. Another embodiment of a magnet receptive panel (10) is shown in FIG. 1B. The magnet receptive panel 10 of FIGS. 1A and 1B comprises a prefabricated core (12) and a grid of magnet receptive elements (14) applied to the panel surface (16). In addition to the embodiments of FIGS. 1A and 1B, a magnet receptive building panel can be made in any shape with a core of any thickness, length and shape and a pattern of magnet receptive elements adhered to at least one surface of the core and/or embedded in the core.

The core (12) can be a gypsum core formulated and prepared according to any methods known to a person of skill. In some embodiments, the gypsum core is prepared from a gypsum slurry which is formulated from calcined gypsum and water. Additional components may be added to the gypsum slurry and water. Such components may include at least one of the following or any combination of the following: a surfactant, filler, binder, fibers, defoamer, biocide, set accelerator, plasticizer and set retarder. Suitable surfactants include, but are not limited to, alkyl sulfates, alkyl ether sulfates and mixtures thereof. Suitable fillers include, but are not limited to, any type of clay, sand, cement, calcium carbonate and any combination thereof. Suitable binders include, but are not limited to, starch, poly-acrylate and any combination thereof. Suitable fibers include, but not limited to, paper print, other cellulosic fibers, glass fiber and mineral wool, and any mixture thereof. Suitable accelerators include, but are not limited to any anions that are known as set accelerators, including sulfates, nitrates and chlorides. Suitable biocides include, but are not limited, to pyrithiones, such as sodium OMADINE or zinc OMADINE Suitable plasticizers include, but are not limited to, naphthalene sulfonate, melamine sulfonate, a polycarboxylate and any mixture thereof.

A person of skill will appreciate that while in some embodiments, a building panel is made with the gypsum core (12), in other embodiments, a panel core can be made with other materials such as for example, cement which can be used in combination with or instead of calcined gypsum for making a panel core. In other embodiments, a panel can be also made of plastic. A person of skill will also appreciate that a panel has several surfaces, one of the surfaces may be facing a room after installation. Any such surface of the panel is referred to as a front facing surface or simply facing surface. The surface on the other side of the panel is called the back surface.

In some embodiments, the grid of magnet receptive elements (14) has a disjointed pattern. In some embodiments, the disjointed grid pattern is made by rows of magnet receptive elements (14A) and (14B) as shown in FIG. 1A or 1B. In some embodiments all magnet receptive elements in the grid (14) are made from the same material attractive to a magnet. In other embodiments, the magnet receptive element (14A) may be different in its composition from the magnet receptive element (14B). A magnet receptive panel with a plurality of different magnet receptive elements is also contemplated.

A person of skill will readily recognize that a magnet receptive element can be made from any material which is attracted to a magnet. Such magnet receptive materials may include iron, nickel, cobalt, alloys, and in particular alloys with rare earth metals, and naturally occurring minerals. While in some embodiments, the material is magnetically receptive, in other embodiments a magnetic material can be also used. Thus, at least some magnet receptive elements have magnetic properties.

In some embodiments, a magnet receptive element can comprise a pre-fabricated sheet or tape made from a magnet receptive material. In some embodiments, a magnet receptive element can comprise a pre-fabricated sheet or tape made from a ferromagnetic material. It is also desired in some embodiments that the thickness of the magnetic receptive tape or sheet is thin or thick. In some embodiments the thickness of the tape or sheet may be from 1 thousandth of inch to 100 thousandth of inch. In further embodiments, the magnet receptive tape or sheet may be covered on one side with paper or joint tape. In some embodiments, the magnet receptive element can be a tape, paint, sheet, foil, shim, strip or coating.

In some embodiments, the magnet receptive elements can be adhered with an adhesive to the surface of a panel core. In other embodiments, the magnet receptive elements can be attached or adhered to the gypsum core before it sets and without the need for an adhesive. In other embodiments, the magnet receptive elements can be attached to the gypsum core after the gypsum core sets. In other embodiments, the magnet receptive elements can be attached to the panel core after the panel core sets partially.

In further embodiments, the magnet receptive element (14A) and/or (14B) comprises a paint prepared with a magnet attractive material. The grid (14) is then printed or painted on the building panel surface. In some embodiments, the grid is painted or printed on the gypsum core surface before the gypsum panel sets. In other embodiments, the grid is painted or printed on the gypsum core surface after the gypsum panel sets at least partially.

In some embodiments, the magnet receptive element (14A) and/or (14B) comprises a paint, coating, foil, shim, strip, or tape prepared with a magnet attractive material. The grid can be located on the inside or outside surface of the outside paper cover sheet or embedded between plies of paper cover sheets. Paper in this case refers to either or both the face paper and back paper cover sheet.

In some embodiments, the magnet receptive element (14A) and/or (14B) comprises a paint, coating, foil, shim, strip, or tape prepared with a magnet attractive material. In will be appreciated that at least in some embodiments, the magnet receptive elements have magnetic properties and can be used as a magnet. The magnetic attractive material is then placed on a non-receptive material such as plastic or paper then attached to the core or the inside of the paper or outside of the paper. Paper in this case refers to either or both the face paper or back paper. The grid of magnet receptive elements (14) may be suitable for use with at least one type of a magnet. A person of skill will understand that the term "magnet" is used in this disclosure broadly and includes any object that produces a magnetic field. Such magnets include, but are not limited to, alnico magnets, magnets made from ferromagnetic materials, rare-earth magnets, ceramic magnets, neodymium magnets and the like. In some embodiments, suitable magnets may include flexible magnets. In other embodiments, a magnet may include a device that produces a magnetic field.

The size and shape of magnet receptive elements (14A) and (14B) may vary. In some embodiments, the magnet receptive elements (14A) and (14B) are of the same shape and size. In other embodiments, the magnet receptive element (14A) differs from the magnet receptive element 14B by at least one of the following: shape or size. Suitable shapes independently for elements 14A and 14B include, but are not limited to, squares, rectangles, stars, triangles and circles. A person of skill will appreciate that the shapes can be open or closed. If the shapes are open, they can have any size opening.

In some embodiments, an area of a magnet receptive element is from about 5 square millimeters to about 50 square centimeters. In some embodiments, an area of a magnet receptive element is from about 5 square millimeters to about 40 square centimeters. In some embodiments, an area of a magnet receptive element is from about 5 square millimeters to about 30 square centimeters. In some embodiments, an area of a magnet receptive element is from about 5 square millimeters to about 20 square centimeters. In some embodiments, an area of a magnet receptive element is from about 5 square millimeters to about 10 square centimeters. In some embodiments, an area of a magnet receptive element is from about 5 square millimeters to about 5 square centimeters. In some embodiments, an area of a magnet receptive element is from about 5 square millimeters to about 1 square centimeter. In some embodiments, an area of a magnet receptive element is at least 1 square centimeter. In some embodiments, an area of a magnet receptive element is at least 2 square centimeters. In some embodiments, an area of a magnet receptive element is at least 3 square centimeters. In some embodiments, an area of a magnet receptive element is at least 4 square centimeters. In some embodiments, an area of a magnet receptive element is at least 5 square centimeters. In some embodiments, an area of a magnet receptive element is at least 6 square centimeters. In some embodiments, an area of a magnet receptive element is at least 7 square centimeters. In some embodiments, an area of a magnet receptive element is at least 8 square centimeters. In some embodiments, an area of a magnet receptive element is at least 9 square centimeters. In some embodiments, an area of a magnet receptive element is at least 10 square centimeters. In some embodiments, the size of a magnet receptive element can be increased to the size of the panel itself such that at least one surface of the panel is covered almost completely with the magnet receptive element.

At least is some embodiments, magnet receptive elements are applied such that they create horizontal rows with at least two magnet receptive elements in each row. In some embodiments, magnet receptive elements from two adjacent horizontal rows may be aligned in columns as shown in FIG. 1B. In other embodiments, magnet receptive elements in the second horizontal row are shifted in comparison to the first horizontal row, as shown in FIG. 1A. In other embodiments, magnet receptive elements are applied in a grid with a circle pattern. A person of skill will appreciate that any disjointed pattern of magnet receptive elements can be suitable in at least some embodiments.

As shown in FIG. 1B, magnet receptive elements in the second horizontal row are aligned under magnet receptive elements in the first horizontal row. This creates a vertical passage of spaces 18 between magnet receptive elements from two adjacent columns of magnet receptive elements. The vertical passage of spaces 18 remains free of magnet receptive elements. As can be appreciated from FIG. 1B, there is also a horizontal passage of spaces 19 between two adjacent horizontal rows of magnet receptive elements. Thus, embodiments of FIGS. 1A and 1B provide grid patterns in which magnet receptive elements are disjointed and some panel surface area between the magnet receptive elements remains free of the magnet receptive elements. In some embodiments, magnet receptive elements cover from about 100% to about 1% of a panel surface, while the rest of the surface remains as spaces (also referred to as intersections or gaps) between magnet receptive elements, and magnet receptive elements are not connected at the intersections.

In other embodiments, magnet receptive elements from two adjacent horizontal rows are applied to a gypsum panel surface with a shift. In some embodiments, a shift is such that the magnet receptive elements from the two adjacent horizontal rows do not align, and a grid is created in a chess-board pattern. One of such embodiments is shown in FIG. 1A.

It will be appreciated by a person of skill from FIGS. 1A and 1B that the width (W) of the space (18) between two adjacent magnet receptive elements situated in the same horizontal row may or may not be equal to the length of a magnet receptive element. In some embodiments, the spacing between adjacent magnet receptive elements can vary within the same row or column or other pattern. In some embodiments, the width (W) in the space (18) is at least 1 millimeters, but less than 10 centimeters. In other embodiments, the width (W) of the space (18) may be at least 5 millimeters, but less than 9 centimeters, less than 8 centimeters, less than 7 centimeters, less than 6 centimeters, less than 5 centimeters, less than 4 centimeters, less than 3 centimeters, less than 2 centimeters, or less than 1 centimeter. In some embodiments, the width (W) of the space (18) is 0 and each horizontal row is a continuous row. In some embodiments, all of the gypsum panel surface (16) is covered with the grid of magnet receptive elements (14). In other embodiments, only a portion of the gypsum panel surface (16) is covered with the grid of magnet receptive elements (14).

It will be also appreciated by a person of skill from FIGS. 1A and 1B that the width (D) of the space (19) between two adjacent magnet receptive elements situated in the adjacent horizontal rows may or may not be equal to the length of a magnet receptive element. In some embodiments, the width (D) of the space (19) is at least 5 millimeters, but less than 10 centimeters. In other embodiments, the width (D) of the space (19) may be at least 5 millimeters, but less than 9 centimeters, less than 8 centimeters, less than 7 centimeters, less than 6 centimeters, less than 5 centimeters, less than 4 centimeters, less than 3 centimeters, less than 2 centimeters, or less than 1 centimeter. In some embodiments the width (D) of space 19 (19) is equal to the width (W) of space 18 (18).

Figure 2:
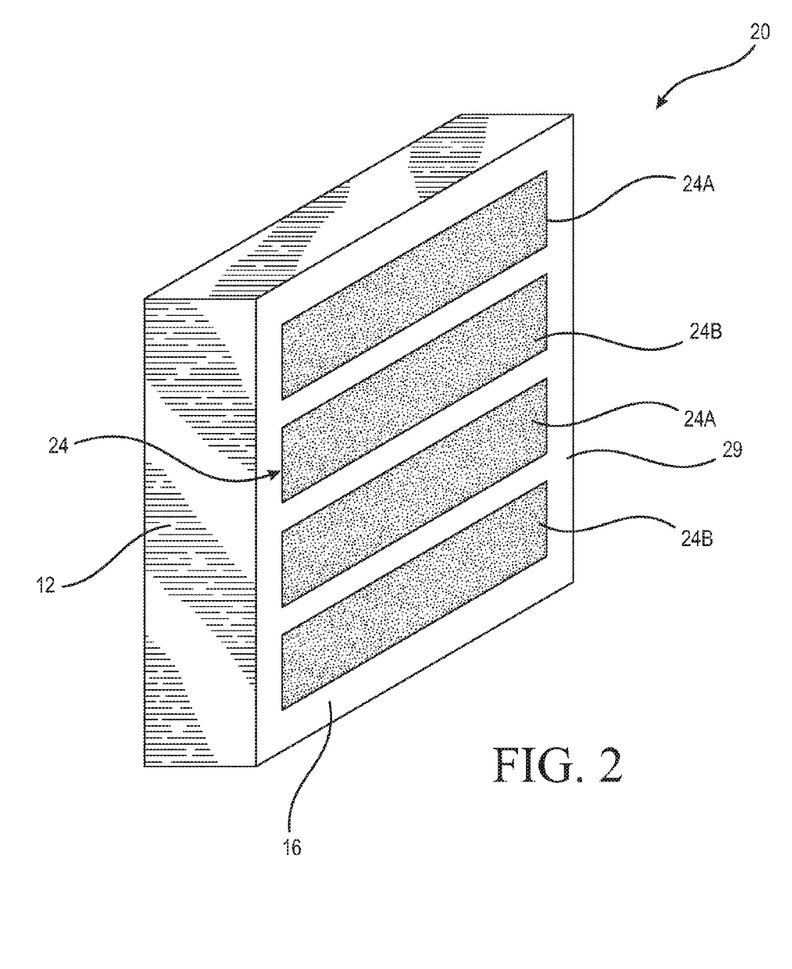
FIG. 2 is a front view of an alternative embodiment for a building panel with a grid of magnet receptive elements.

In further embodiments, a magnet receptive element is a magnet receptive tape which is applied in horizontal rows or magnet receptive paint which is applied in horizontal rows, as shown in FIG. 2. In this embodiment, a building panel, generally 20, comprises a grid of magnet receptive elements, generally (24) which are applied to the panel surface (16) of the panel core (12) in horizontal rows (24A and 24B), as shown in FIG. 2. In these embodiments, the distance (29) between two adjacent rows (24A) and (24B) may vary. In some embodiments, the distance (29) is at least 1 centimeter, but no more than 50 centimeters. In other embodiments, the distance (29) is at least 1 centimeter, but no more than 40, 35, 30, 25, 20, 15, 10 or 5 centimeters. The grid of receptive elements (24) may cover only a portion of the panel surface (16) or the grid of receptive elements (24) may cover all of the panel surface (16). Magnet receptive elements in two rows (24A) and (24B) may be made from the same magnet attractive material. In alternative embodiments, magnet receptive elements in two rows (24A) and (24B) may be made from at least two different magnet attractive materials. A person of skill will appreciate that in alternative embodiments, magnet receptive elements can be applied in vertical rows, can be regular, irregular or can arranged in any other geometric pattern.

Figure 3:
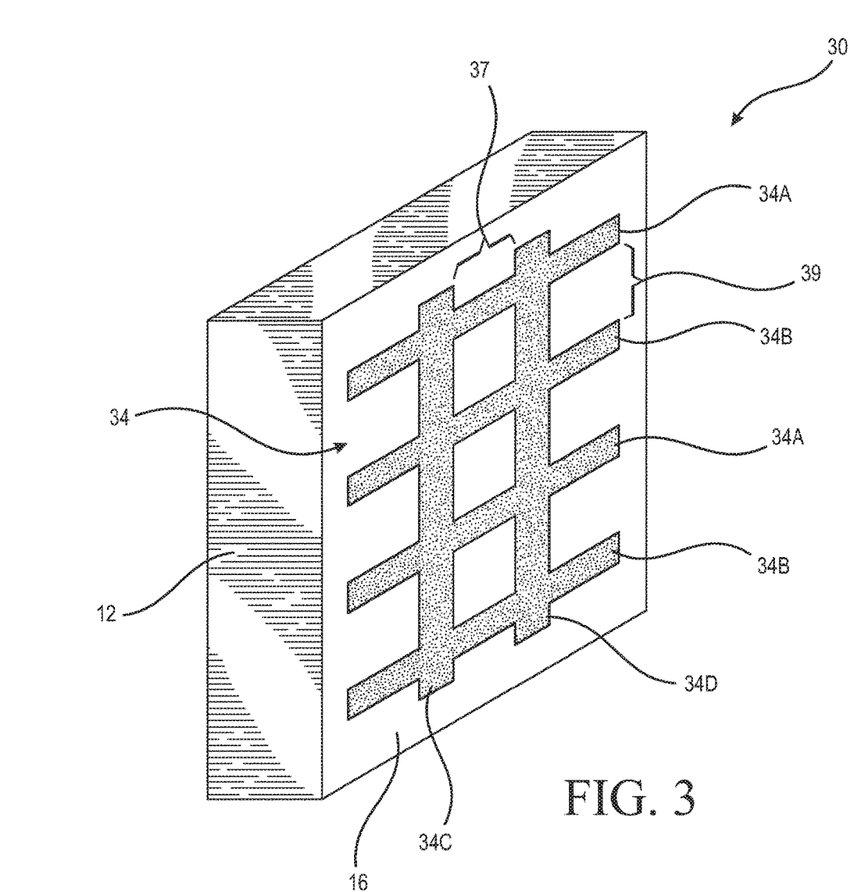
FIG. 3 is a front view of an alternative embodiment for a building panel with a grid of magnet receptive elements.

An alternative embodiment for a magnet receptive panel, generally 30, is shown in FIG. 3. In this embodiment, a grid of magnet receptive elements, generally (34) is applied to the panel surface (16) of the panel core (12) in continuous horizontal rows of magnet receptive elements (34A and 34B) and vertical rows of magnet receptive elements (34C and 34D), as shown in FIG. 3. In these embodiments, the distance (39) between two adjacent horizontal rows of magnet receptive elements (34A) and (34B) may vary. In some embodiments, the distance (39) is at least 1 centimeter, but no more than 50 centimeters. In other embodiments, the distance (39) is at least 1 centimeter, but no more than 40, 35, 30, 25, 20, 15, 10 or 5 centimeters.

The distance (37) between two adjacent vertical rows of magnet receptive elements (34C) and (34D) may vary. In some embodiments, the distance (37) is at least 1 centimeter, but no more than 50 centimeters. In other embodiments, the distance (37) is at least 1 centimeter, but no more than 40, 35, 30, 25, 20, 15, 10 or 5 centimeters. The grid of receptive elements (34) may cover only a portion of the panel surface (16) or the grid of receptive elements (34) may cover all of the gypsum panel surface (16). In some embodiments, magnet receptive elements in horizontal and vertical rows (34A, 34B, 34C and 34D) may be made from the same magnet attractive material. In alternative embodiments, magnet receptive elements in horizontal rows (34A) and (34B) may be made from a first magnet receptive material, while magnet receptive elements in vertical rows (34C) and (34D) may be made from a second magnet receptive material. Each of the first and second magnet receptive materials can be independently selected from any materials which attract magnet.

Figure 4:
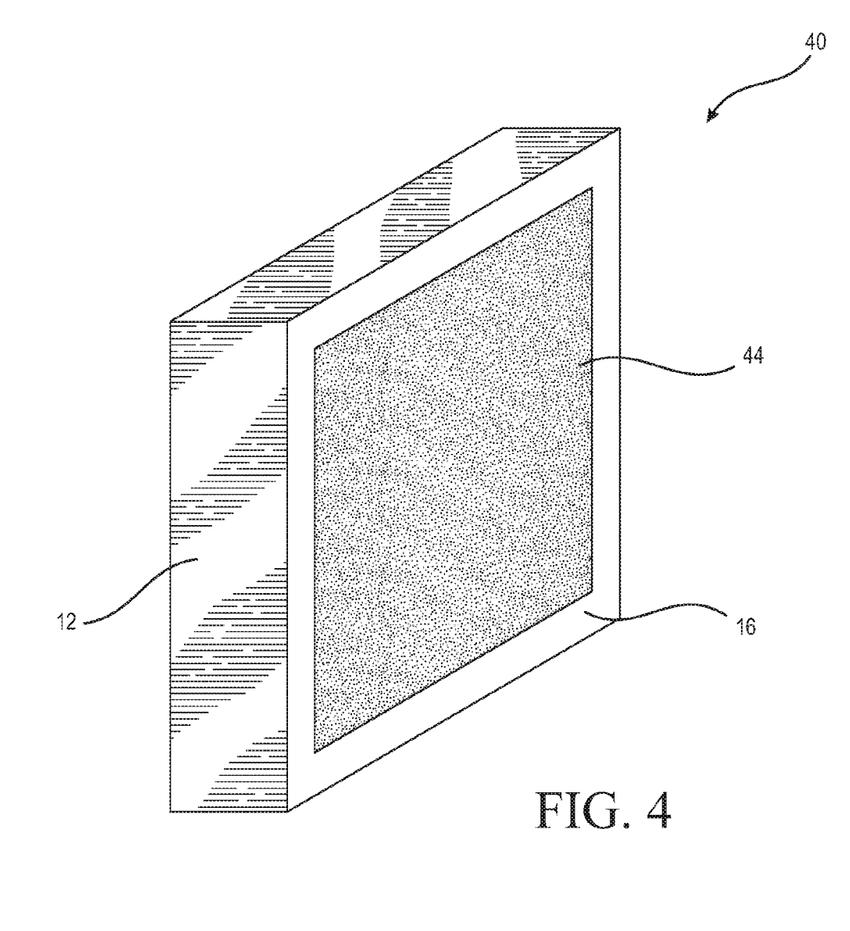
FIG. 4 is a front view of an alternative embodiment for a magnet receptive building panel.

An alternative embodiment for a magnet receptive building panel is shown in FIG. 4. In this embodiment, a suitable magnet receptive material is applied to the panel surface (16) of the panel core (12) as a continuous magnet receptive sheet (44). In some embodiments, the magnet receptive sheet (44) covers the panel surface (16) completely. In other embodiments, the magnet receptive sheet (44) covers the panel surface (16) partially.

A person of skill will appreciate that magnet receptive panels include fiberboards, wallboards, cement boards, ceilings and floorings. Some embodiments include fiberboards in which a gypsum core is made with at least mineral wool, calcined gypsum and water.

Figure 5:
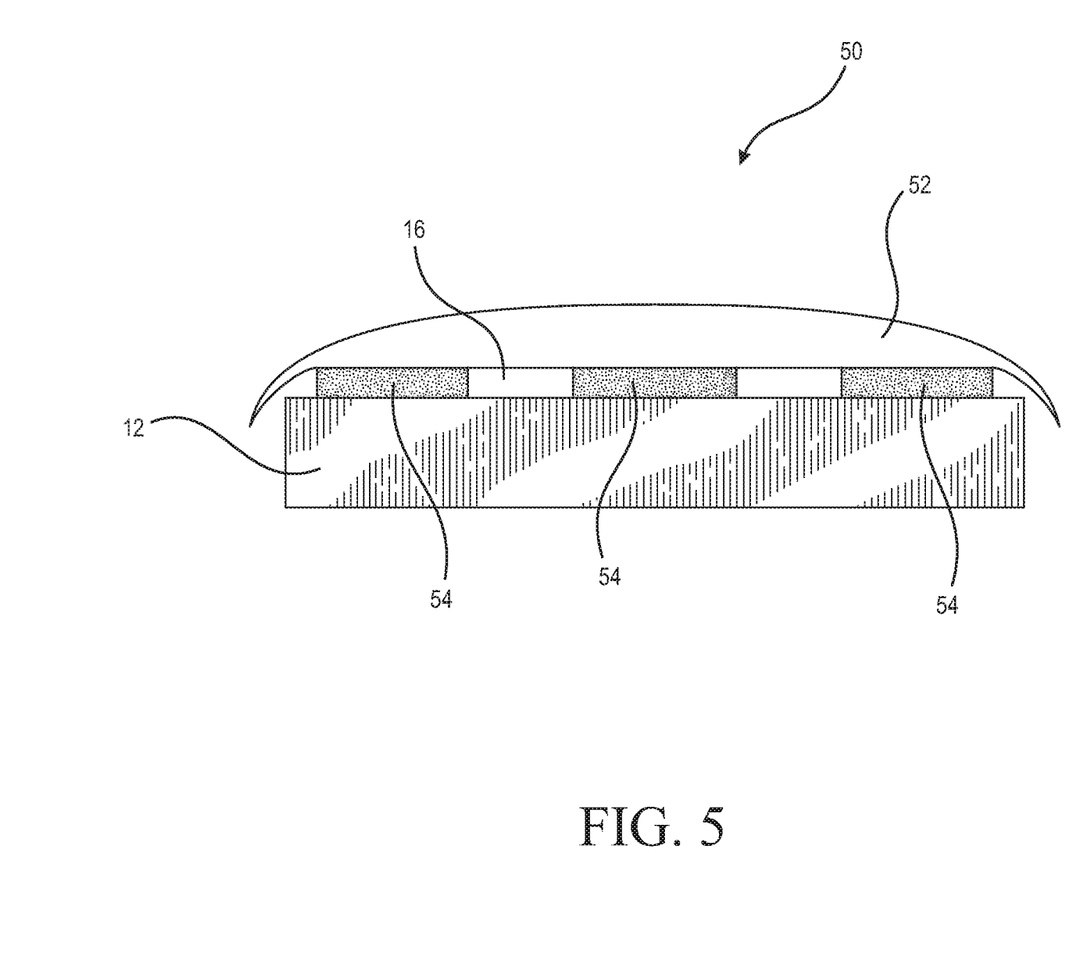
FIG. 5 is a cross-sectional view of a building panel with a grid of magnet receptive elements, with the panel being further covered with at least one cover layer applied over the grid.

Other embodiments contemplate wallboards. FIG. 5 is a cross-sectional view of one embodiment of a magnet receptive wallboard, generally 50. In this embodiment, a panel core (12) may be a gypsum core. The wallboard 50 comprises a grid of magnet receptive elements (54) on at least one surface (16). The building panel is covered with a cover sheet (52) which is applied over at least a portion of the grid of magnet responsive elements (54) and panel surface (16) such that the grid of magnet responsive elements (54) is sandwiched between the gypsum core (12) and the cover sheet (52).

In some embodiments, the cover sheet (52) is a paper cover sheet. In other embodiments, the cover sheet (52) may be a mat or screed. At least in some further embodiments, another cover sheet is applied over the gypsum core surface which is opposite to the surface (16) such that a magnet receptive gypsum panel is sandwiched between two cover sheets. In some embodiments, both cover sheets are made from the same material, for example, both cover sheets are paper cover sheets. In other embodiments, at least one cover sheet is a piece of paper, while the other cover sheet can be a mat or screed.

Further embodiments include those embodiments in which the cover sheet (52) comprises a coating. This coating can be applied over a piece of paper or mat. In alternative, the cover sheet (52) may comprise a coating which is applied directly over the grid of magnet receptive elements (54). Various coatings are contemplated including paints, water-resistant coatings and any combination thereof. In some embodiments, at least two different coatings can be applied in sequence. In some embodiments, at least one coating can be a paint. In some embodiments, plastic can be used as a cover sheet either alone or in combination with other coatings, cover sheets and paints.

Figure 6:
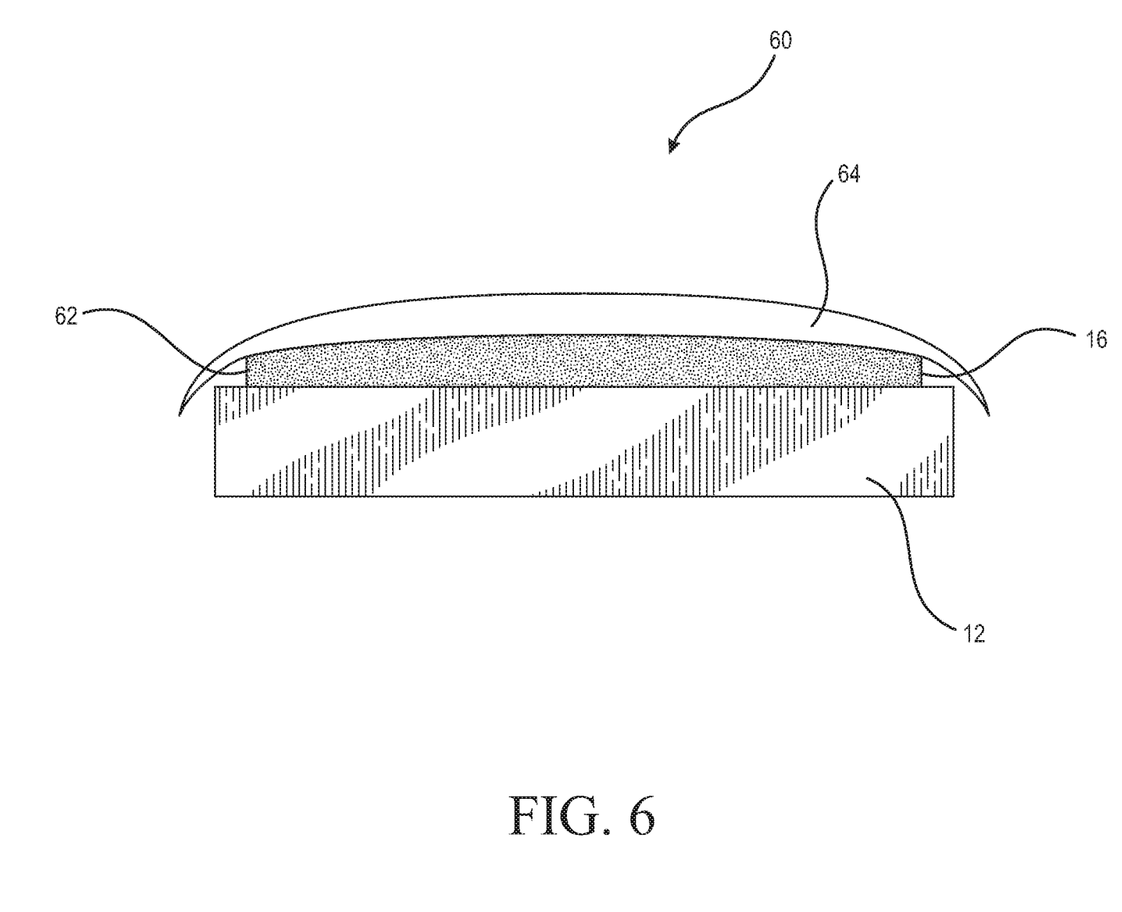
FIG. 6 is a cross-sectional view of a building panel coated with a layer of magnet receptive elements, with the building panel being further covered with a least one cover layer applied over the layer of magnet receptive elements.

While in many embodiments, a magnet receptive panel comprises a grid of magnet receptive elements, other embodiments are contemplated as well in which magnet receptive elements are applied as a continuous layer over a panel. FIG. 6 depicts a cross-sectional view of one embodiment for a magnet receptive panel, generally (60). In this embodiment, magnet receptive elements are applied as a continuous layer (62) over at least a portion of panel core (12), such that at least a portion of the surface (16) of the panel (12) is covered with the magnet receptive layer (62). In some further embodiments, a cover sheet (64) can be applied over the magnet receptive layer (62). Various cover sheets can be suitable, including paper cover sheets and polymeric mats. In some embodiments, a cover sheet can be applied on the front side of a panel. In other embodiments, a cover sheet can be applied on the back side of a panel. In further embodiments, a panel includes a core sandwiched between the back cover sheet and the front cover sheet. In embodiments with cover sheets, magnet receptive elements can be located at least in one of the following locations: on the outside surface of the back cover sheet, embedded within the back cover sheet, located the back cover sheet and the panel core, within the panel core, between the panel core and the face cover sheet, embedded within the face cover sheet and/or on the outside of the face cover sheet.

In some embodiments, the magnet receptive layer (62) is a tape which is attractive to a magnet. This tape can be made from any material attractive to a magnet. In some embodiments, the tape is ferrous metal tape. In other embodiments, the magnet receptive layer (62) is a sheet which is attractive to a magnet. In some embodiments, this sheet can be adhered to the panel core with an adhesive. In some embodiments, the sheet is made from ferrous metal material.

Further embodiments include methods and kits for making a magnet receptive building panel. In some methods for making a magnet receptive building panel, a gypsum slurry is formulated from calcined gypsum, water and other components selected from at least one of the following: a binder, filler, fibers, surfactant, defoamer, set accelerator, set retarder and any mixture thereof.

A front cover sheet is continuously fed on a moving conveyer and a grid of magnet receptive elements is applied over it in any pattern suitable for a particular purpose. In some embodiments, the grid is a set of horizontal rows, vertical rows or a combination of the two. In other embodiments, the grid is a set of disjointed magnet receptive elements organized in any pattern. In other embodiments, the grid is a set of disjointed magnet receptive elements which is not organized in any pattern and applied at random.

The gypsum slurry is then continuously deposited over the grid onto the front cover sheet. A second back cover sheet is optionally applied such that the gypsum core becomes sandwiched between the two cover sheets. A magnet receptive gypsum panel is then allowed to set and is cut to size. In this process, each of a front cover sheet and back cover sheet can be independently a piece of paper, plastic mat or screed. In some embodiments, the grid of magnet receptive elements is created by laying a magnet receptive tape in any desired pattern over the front cover sheet and prior to depositing the gypsum slurry over it. In other embodiments, the grid can be created by applying a magnet receptive paint in a pattern. At least in some embodiments, the front cover sheet bearing the grid of magnet receptive elements can be premade and stored until needed for production of a magnet receptive panel. At least in some embodiments, the grid of magnet receptive elements is attached to the front cover sheet with an adhesive.

Other embodiments include kits which comprise any of the following: a magnet receptive tape, magnet receptive sheet, magnet receptive paint, an adhesive, or a magnetic tape. Further embodiments also include any of the above kits which further optionally comprise a magnet. The magnet receptive tape can be applied over a premade panel with the adhesive. For example, the magnet receptive tape can be applied over a building panel, such as cement or gypsum panel, which has been already installed. A coating or a cover sheet can be then optionally applied over the magnet receptive tape. In some embodiments, a magnet receptive tape further comprises a paper cover sheet applied to one surface of the tape.

There are many applications for a magnet receptive building panel. For example, pictures, paintings, mirrors, speakers, various sensors, smoke alarms, and LCD screens and other objects can be attached to the magnet receptive building panel with a magnet and without the need for nails or screws or adhesives. This protects the building panel from damage after the objects are removed from the panel. Some attached objects comprise anti-slip materials such for example, alongside the magnet, which prevent the objects from sliding on the wall. At least in some embodiments, a magnet may be coated or dipped to reduce scuffing or marks.

The wireless charging technology provides electric current through a source resonator which induces a specific magnetic field at a specific frequency. A charged or powered electric device can be charged wirelessly with the wireless charging technology. Such devices may include lamps, computers, cell phones and smart phones. Various light fixtures and liquid crystal displays (LCDs) can be attached to a magnet receptive panel with a magnet. These devices can be then charged wirelessly by the wireless charging technology. In some embodiments, a wireless charging technology resonator can be set up at a remote location. For example, it can be positioned behind the wall or ceiling with magnet receptive elements. The inventors have discovered that a grid of magnet receptive elements works well in transmitting a signal from a resonator through a magnet receptive panel, while a solid sheet of magnet receptive material may interfere with the magnetic field generated by the resonator. At least in some embodiments, a magnet induction (MI) signal repeater can be used in combination with a magnet receptive panel. The magnet induction signal repeater can be used in combination with a resonator to amplify and project a signal to different areas of a magnet receptive panel. This allows to wirelessly install and wirelessly power several light fixtures or LCDs in different areas of a magnet receptive ceiling or wall.

While magnet receptive elements are very useful for attaching various objects to a wall, they may interfere with transmission of a signal from a resonator. It has been unexpectedly discovered, that a disjointed grid pattern in which magnet receptive elements are separated away from each other by some spaces is a grid pattern which does not interfere significantly and can be used for devices which will be charged wirelessly. Such suitable disjointed grid patterns with minimized magnetic field interference include those shown in FIG. 1A and FIG. 1B.

Further embodiments provide a building panel with a maximum number of positions or arrangements for magnet receptive elements to which an object can be attached with a magnet. These panels are also designed such that they minimize the interference of wireless electricity transmission through the panels. When considering both technologies working in conjunction, such as using magnets to hold an object to the wall and using wireless electricity to transfer electricity through a wall, many designs are provided in this disclosure. First, the maximum amount of available magnetic positions can simply be achieved by using a metal sheet on or in the wall; however, this inhibits the wireless electricity transmission through the wall. Other possible patterns include a grid of magnet receptive element of any specific size and shape in strip, diagonal, circular, curved or fractal pattern to accomplish the optimal distribution for magnet receptive elements needed to provide a sufficient holding power. Such grid patterns can be specifically designed for a particular transmitter, receiver, and power device.

The inventors have discovered that a disjointed pattern for magnet receptive elements in which magnet receptive elements are spaced from each other on a panel increases electricity transmission through the panel. The spacing between adjacent magnet receptive elements can be significantly smaller than the size of magnet receptive elements. In some embodiments, the spacing is less than ⅛ inch. In some embodiments, sufficient magnet holding power and only minor interference with electric signal transmission is achieved with a grid in which the spacing between magnet receptive elements is smaller than the size of the magnet receptive elements. This discontinuous grid has an advantage over a continuous grid because the discontinuity allows for the wireless electricity transmission to pass through a magnet receptive panel.

Another technical advantage provided by a building panel in which magnet receptive elements are organized in a grid with spaces between magnet receptive elements includes easy installation as these panels can be cut with a tool commonly used for cutting conventional gypsum panels.

Figure 7A:
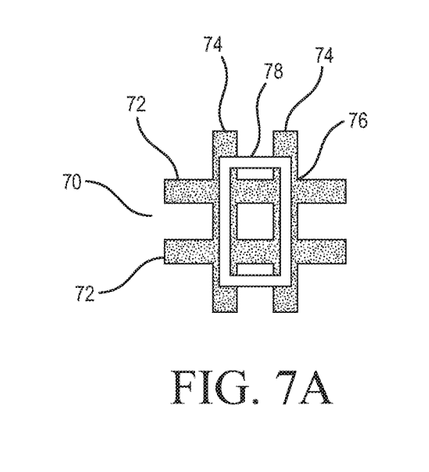
FIGS. 7A-7D depict a magnet receptive panel with a continuous grid of magnet receptive elements in which the magnet receptive elements are connected at intersections.
Figure 7B:
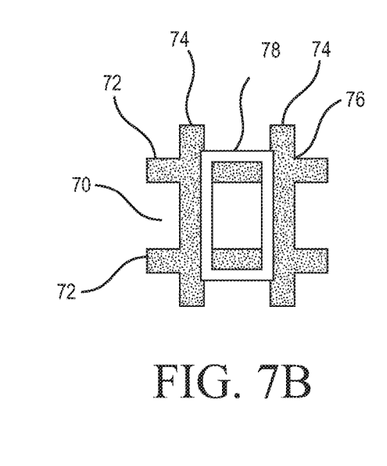
Figure 7C:
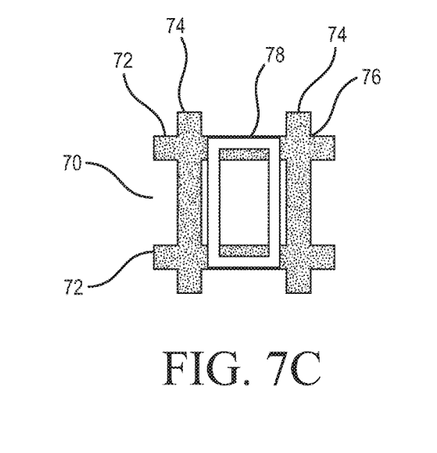
Figure 7D:
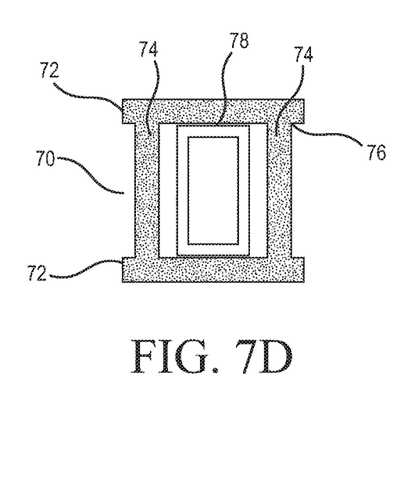
Figure 7E:
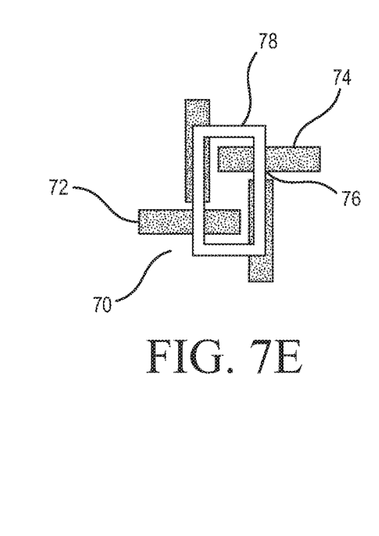
FIGS. 7E-7F depict a magnet receptive panel with a disjointed grid of magnet receptive elements in which magnet receptive elements are not connected at intersections.
Figure 7F:
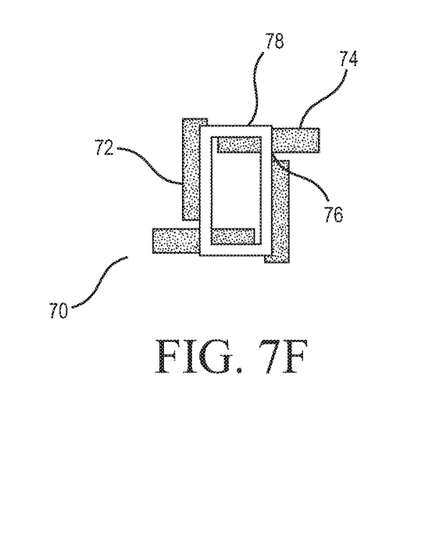

Referring to FIGS. 7A-7F, these figures depict various grids, generally (70) for magnet receptive panels. In these embodiments, a magnet receptive element is a magnet receptive tape which is arranged in first set of rows (72) and a second set of rows (74). As can be appreciated from embodiments in FIGS. 7A-7D, the tape from the rows (74) and the rows (72) is connected at intersections (76) in these embodiments. As can be appreciated from the embodiments of FIGS. 7E-7F, the tape from the rows (74) and the rows (72) is not connected at intersections (76) in these embodiments. Thus, the embodiments of FIGS. 7A-7D are continuous grids, while the embodiments of FIGS. 7E-7F are disjointed grids. The embodiments of FIGS. 7A, 7B, 7C and 7D differ from each other by the size of the grid as can be appreciated from a comparative size of a receiver (78) which overlaps almost completely with the tape in FIG. 7B, partially in FIGS. 7A and 7C and fits inside the grid of FIG. 7D. The embodiments of FIGS. 7E and 7F create a grid of about same size as the embodiments of FIGS. 7A and 7B respectively, but for no connections at the intersections. Thus, just like in FIG. 7B, the receiver (78) overlaps almost completely with the tape in the embodiment of FIG. 7F because this grid in FIG. 7F is of the same size as the grid in FIG. 7B.

Figure 8A:
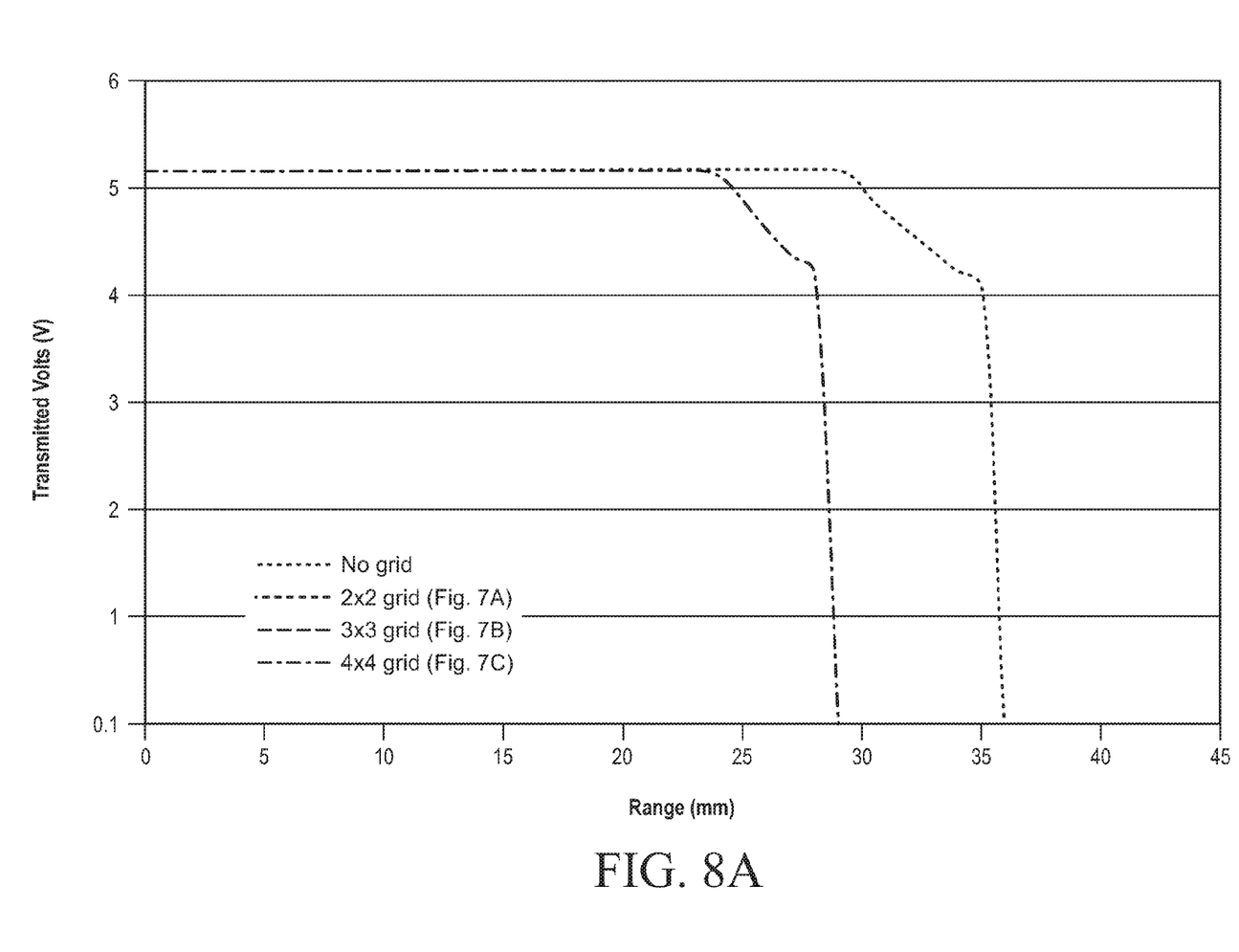
Figure 8B:
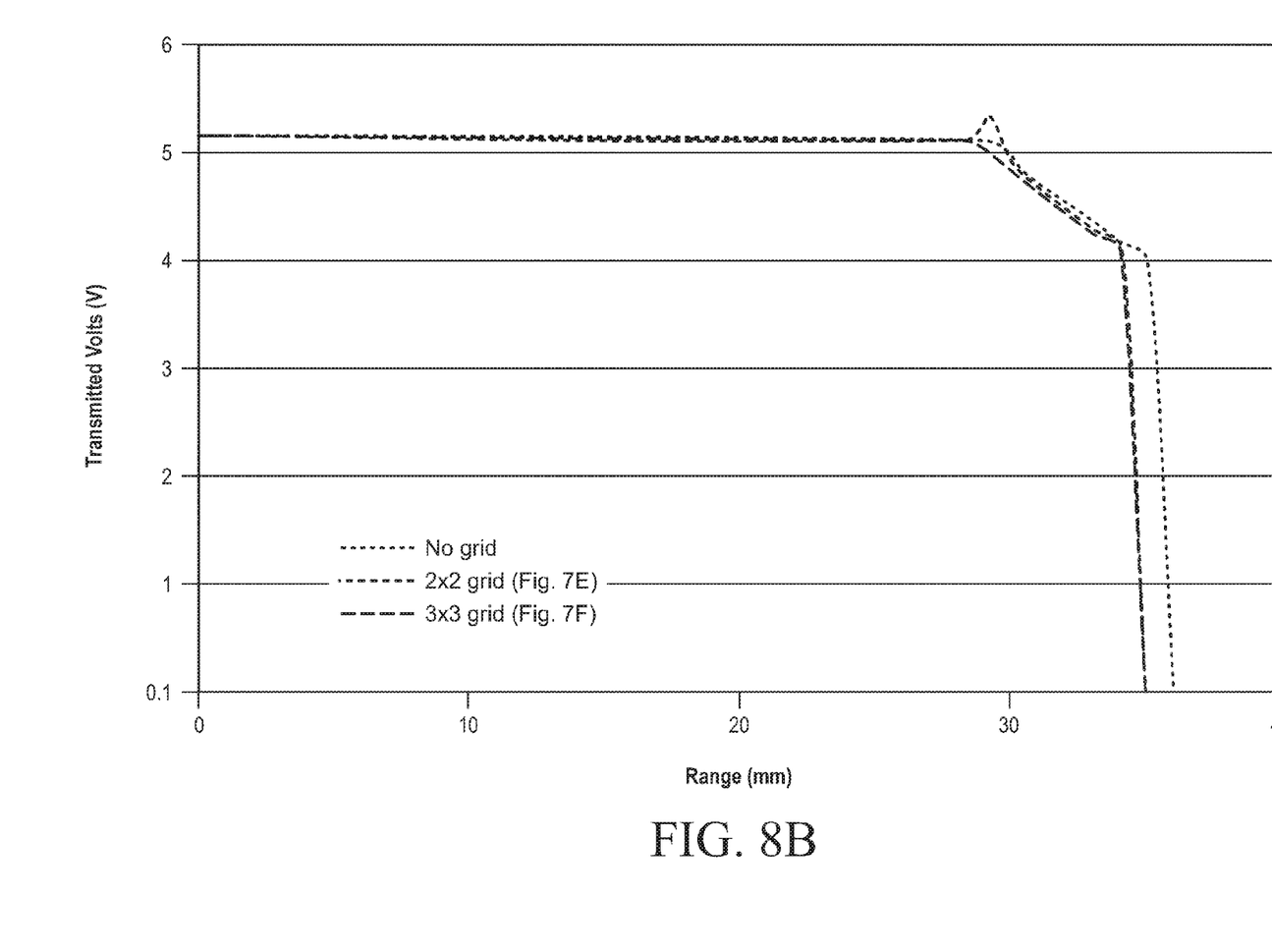

In conductivity studies through building panels with grids of FIGS. 7A-7F, it has been unexpectedly discovered that a significant technical advantage can be achieved with a disjointed grid. As can be seen from the conductivity graphs in FIGS. 8A and 8B, the panel embodiment with a continuous grid interferes significantly with electricity transmission when a receiver overlaps with magnet receptive elements as shown in FIG. 8A. Yet, the panel embodiment with a disjointed grid in which a receiver also overlaps with magnet receptive elements does not interfere or interferes only minimally with conducting the electricity through the panel, as shown in FIG. 8B. Thus, a disjointed magnet receptive pattern is more effective at transmitting wireless electricity than a connected magnet receptive pattern. This allows the positioning of more magnet receptive elements per a square foot of a magnet receptive panel in a disjointed grid, which is technically advantageous as more objects can be attached to such panels because these panels have a better object holding potential and a greater design flexibility for positioning objects on the panel.

Further embodiments provide panels with a pattern of magnet receptive elements optimized for use in conjunction with wireless electricity transmission. It is contemplated that the pattern in these embodiments is designed with consideration of transmission power, receiver power, transmitter size, receiver size, required output of receiver, range between transmitter and receiver, and population of transmitters, repeaters, and receivers.

EXAMPLE 1

Making and Testing Magnetic Panels with Different Grid Patterns

Two types of magnetic wallboards were prepared. One magnetic wallboard type had a rudimentary disjointed grid pattern of magnet receptive elements. The other magnetic wallboard type was prepared with a continuous grid pattern of magnet receptive elements. In the continuous grid pattern, magnet receptive tape was used, and a pattern was created without spaces. In a rudimentary disjointed grid pattern of magnet receptive elements, two wallboards were prepared which differ from each other by the size of spaces between magnet receptive elements.

All wallboards were tested using the same wireless electricity transmission device at the same voltage. A multimeter was used to measure electric voltage transmitted through each wallboard, and data from these measurements is listed in Table 1 below.

TABLE 1

Transmission Through Wallboards

| Wallboard Type | Conductivity Through Wallboard (Volts) |
|---|---|
| Magnet receptive elements applied in a continuous grid pattern | 0.00 |

TABLE 1-continued

Transmission Through Wallboards

| Wallboard Type | Conductivity Through Wallboard (Volts) |
|---|---|
| Magnet receptive elements applied in a rudimentary disjointed grid pattern with the width of spaces between two adjacent magnet receptive elements being 1/4 of the length of a magnet receptive element | 4.49 |
| Magnet receptive elements applied in a rudimentary disjointed grid pattern with the width of spaces between two adjacent magnet receptive elements being about ½ a magnet receptive element | 4.64 |
| Control (transmission in a circuit without a board) | 5.16 |

As can be seen from Table 1, an electric circuit was created where a multimeter was detecting a signal of about 5.16 Volts from a receiver. Various wallboards were placed between a signal generator and receiver, and the electric voltage in the circuit was measured again. As can be seen from Table 1, while there was some interference detected for a wallboard with a rudimentary disjointed grid pattern (4.64 versus 5.16 and 4.49 versus 5.16), the significant portion of the voltage (about 70% to 90%) was still transmitted through these wallboards. In contrast, a magnet receptive wallboard with a continuous magnet receptive grid has failed to transmit any signal. It was further noted that the size of spaces between magnetic receptive elements was important and grids with larger spaces between magnet receptive elements transmitted wireless electric signal more efficiently in comparison to grids with smaller spaces between magnet receptive elements.

EXAMPLE 2

Comparative Analysis of Magnetic Panels with Connected Grids to Magnetic Panels with Disjointed Grids Magnet receptive panels were prepared with the following 6 grid patterns as shown in FIGS. 7A-7F. In the embodiments of FIGS. 7A through 7D, a magnet receptive element was a metallic tape (1 inch wide, 0.01 inch thick steel shim). This tape was arranged in a grid with a spacing where the tape was connected at the intersections. In the embodiment of FIG. 7A, the size of the grid was 2×2 inches. The size of the grid in FIG. 7B was 3×3 inches. The size of the grid in FIG. 7C was 4×4 inches, and the size of the grid in FIG. 7D was 5×5 inches.

In the embodiments of FIGS. 7E and 7F, the grid was disconnected and the magnet receptive tape of FIGS. 7A-7D was arranged such that the grid spacing was disjointed and the tape was not connected at the intersections. The size of the grid in FIG. 7E was 2×2 inches and the size of the grid in FIG. 7F was 3×3 inches.

All panels were subjected to a test as was described in Example 1. Each panel was placed between a power source and a wireless receiver which was connected to a multimeter recoding voltage from the receiver.

The wireless receiver is shown in FIGS. 7A-7F as a rectangle and its position over each of the grids is also shown in each of the drawings. As can be seen from FIGS. 7A and 7B, the receiver was overshadowed by the tape. In the embodiment of FIG. 7C, the receiver overlapped with the tape partially, and in the embodiment of FIG. 7D, the receiver fitted inside of a space created by the tape. In the disjointed grid of FIG. 7E, the receiver overlapped with the tape partially, while in the disjointed grid of FIG. 7F, the receiver overlapped with the tape almost completely, but for the intersections in which the tape was not connected.

In conductivity tests, the receiver was moved away from the power source to a different distance in the range from 0 mm to 36 mm.

As can be seen from Table 2, a receiver placed at 0 mm from a power source over a wallboard with no grid, receives a signal of 5.16 Volts. The signal gradually decreases as the receiver is moved to the distance of 36 mm from the power source. In contrast to this control with no grid, a 2×2 grid of the embodiment of FIG. 7A interferes completely with transmission and no current is transmitted through this panel. The embodiment with a 3×3 grid of FIG. 7B still interferes significantly with transmittal. The embodiments with a 4×4 and 5×5 grids (FIGS. 7C and 7D) transmit some electricity. The data of Table 2 is plotted as graphs in FIG. 8A.

TABLE 2

| Wallboards with Connected Grid Spacing | | | | | | | | | | | | | | |
|---|---|---|---|---|---|---|---|---|---|---|---|---|---|---|
| No grid | | | 2x2 grid (FIG. 7A) | | | 3x3 grid (FIG. 7B) | | | 4x4 grid (FIG. 7C) | | | 5x5 grid (FIG. 7D) | | |
| Range (mm) | Volts | Percent of max | Range (mm) | Volts | Percent of max | Range (mm) | Volts | Percent of max | Range (mm) | Volts | Percent of max | Range (mm) | Volts | Percent of max |
| 36 | 0 | 0% | 40 | 0 | 0% | 40 | 0 | 0% | 29 | 0 | 0% | 36 | 0 | 0% |
| 35 | 4.05 | 78% | 35 | 0 | 0% | 35 | 0 | 0% | 28 | 4.14 | 80% | 35 | 4.05 | 78% |
| 34 | 4.2 | 81% | 30 | 0 | 0% | 30 | 0 | 0% | 27 | 4.36 | 84% | 34 | 4.2 | 81% |
| 33 | 4.39 | 85% | 25 | 0 | 0% | 25 | 0 | 0% | 26 | 4.6 | 89% | 33 | 4.39 | 85% |
| 32 | 4.57 | 89% | 20 | 0 | 0% | 20 | 0 | 0% | 25 | 4.85 | 94% | 32 | 4.57 | 89% |
| 31 | 4.76 | 92% | 15 | 0 | 0% | 15 | 0 | 0% | 24 | 5.1 | 99% | 31 | 4.76 | 92% |
| 30 | 4.96 | 96% | 10 | 0 | 0% | 10 | 0 | 0% | 23 | 5.16 | 100% | 30 | 4.96 | 96% |
| 29 | 5.16 | 100% | 5 | 0 | 0% | 5 | 0 | 0% | 22 | 5.16 | 100% | 29 | 5.16 | 100% |
| 0 | 5.16 | 100% | 0 | 0 | 0% | 0 | 0 | 0% | 0 | 5.16 | 100% | 0 | 5.16 | 100% |

As can be seen from Table 3 and unexpectedly, a disjointed 2×2 grid of the embodiment of FIG. 7E does interfere with a current transmission, but still transmits a significant percentage of the transmission voltage. The embodiment with a disjointed 3×3 grid of FIG. 7F also transmits current. The data of Table 3 is plotted as graphs in FIG. 8B.

TABLE 3

Wallboards with Disjointed Grid Spacing

| No grid | | | 2x2 grid (FIG. 7F) | | | 3x3 grid (FIG. 7F) | | |
|---|---|---|---|---|---|---|---|---|
| Range (mm) | Volts | Percent of max | Range (mm) | Volts | Percent of max | Range (mm) | Volts | Percent of max |
| 36 | 0 | 0% | 35 | 0 | 0% | 35 | 0 | 0% |
| 35 | 4.05 | 78% | 34 | 4.14 | 80% | 34 | 4.14 | 80% |
| 34 | 4.2 | 81% | 33 | 4.32 | 84% | 33 | 4.3 | 83% |
| 33 | 4.39 | 85% | 32 | 4.52 | 88% | 32 | 4.49 | 87% |
| 32 | 4.57 | 89% | 31 | 4.72 | 91% | 31 | 4.67 | 91% |
| 31 | 4.76 | 92% | 30 | 4.93 | 96% | 30 | 4.86 | 94% |
| 30 | 4.96 | 96% | 29 | 5.4 | 105% | 29 | 5.06 | 98% |
| 29 | 5.16 | 100% | 28 | 5.16 | 100% | 28 | 5.16 | 100% |
| 0 | 5.16 | 100% | 0 | 5.16 | 100% | 0 | 5.16 | 100% |

The current transmission observed with disjointed grids of FIGS. 7E and 7F is unexpected. Based on the data obtained with a continuous grid in the embodiments of FIGS. 7A-7D, a significant interference is detected for the embodiments in which a receiver overlaps with magnet receptive elements. Despite this and surprisingly, the interference can be significantly decreased if magnet receptive elements are not connected. In comparing FIG. 8A with FIG. 8B, and Table 2 with Table 3, making a magnet receptive panel with a disjointed grid pattern unexpectedly decreases interference. This allows to position more magnet receptive elements per a square foot of a magnet receptive wallboard and still obtain a wallboard with only minimum transmission interference.

What is claimed is:

1. A building panel comprising a magnet receptive element, wherein the panel comprises a gypsum core covered on at least one side with a paper sheet and the magnet receptive element positioned in at least one of the folowing locations: embedded in the gypsum core, embedded in the paper sheet, adjacent to at least one surface of the gypsum core, adjacent to at least one surface of the the paper sheet, or a combination thereof; and wherein
   at least one magnet receptive element comprises at least one of the following: a tape comprising a ferromagnetic material and a paint prepared with a magnet receptive material.

2. The building panel of claim 1, wherein the building panel comprises a plurality of the magnet receptive element that together create a pattern selected from: a disjointed pattern, discontinuous pattern, continuous pattern, grid, array, geometrically spaced, randomly spaced, spaced in at least one direction, and any combination thereof.

3. The building panel of claim 1, wherein the magnet receptive element comprises a ferromagnetic material selected from the group consisting of iron, nickel, cobalt, alloys with rare earth metals and any combination thereof.

4. The building panel of claim 1, wherein the magnet receptive element is capable of producing a magnetic field.

5. The building panel of claim 1, wherein a cover sheet is applied over the magnet receptive element.

6. The building panel of claim 5, wherein the cover sheet is selected from the group consisting of paper, plastic, coating and any combination thereof.

7. The building panel of claim 1, where the panel is selected from the group consisting of a gypsum fiberboard, gypsum wallboard, cement panel, ceiling tile and plastic panel.

8. The building panel of claim 1, wherein at least two magnet receptive elements create a grid with intersections between magnet receptive elements, and wherein the grid is disjointed and magnet receptive elements do not connect at the intersections.

9. The building panel of claim 1, wherein at least two magnet receptive elements are located so that the angle and distance between the elements can be of any value.

10. The building panel of claim 1, wherein at least one magnet receptive element comprises at least one of the following from the group consisting of: a magnet receptive tape, magnet receptive sheet, magnet receptive paint, magnet receptive coating, foil, shim, magnetic tape, magnetic sheet, magnetic paint, magnetic coating, and any combination thereof.

11. The building panel of claim 10, wherein the tape is ferrous metal tape, a magnetic field producing material, or any combination thereof.

12. A method for making a building panel, the method comprising positioning at least one magnet receptive element on the building panel;
   wherein the panel comprises a gypsum core covered on at least one side with a paper sheet and the magnet receptive element positioned in at least one of the following locations: embedded in the gypsum core, embedded in the paper sheet, adjacent to at least one surface of the gypsum core, adjacent to at least one surface of the paper sheet, or a combination thereof; and
   wherein at least one magnet receptive element comprises at least one of the following: a tape comprising a ferromagnetic material and a paint prepared with a magnet receptive material.

13. The method of claim 12, wherein the magnet receptive elements are positioned on the building panel by a method selected from the group consisting of:
   painting the magnet receptive elements on at least one surface of the building panel;
   printing the magnet receptive elements on at least one surface of the building panel;
   attaching the magnet receptive elements with an adhesive to at least one surface of the building panel;
   attaching magnet receptive elements by using a mechanical attaching design or device to at least one surface of the building panel;
   depositing the magnet receptive elements on the surface of the building panel which has not been fully set; and
   any combination thereof.

14. The method of claim 12 comprising:
   placing the at least one magnet receptive element on a cover paper sheet;
   preparing a gypsum slurry;
   depositing the gypsum slurry onto the sheet over the at least one magnet receptive element;
   forming the slurry into a panel; and
   allowing the panel to set.

15. The method of claim 14, wherein the at least one magnet receptive element is adhered to the cover paper sheet with and adhesive.

* * * * *